J. D. Chambers.
Device for Displaying Dry Goods.

Nº 89,383.          Patented Apr. 27, 1869.

Witnesses,
E. Wolff
John F. Brook

Inventor,
John D. Chambers
pr Munn & Co
Attorneys

United States Patent Office.

JOHN D. CHAMBERS, OF WEST LEBANON, INDIANA, ASSIGNOR TO HIMSELF AND REVERDY I BOWLUS, OF THE SAME PLACE.

Letters Patent No. 89,383, dated April 27, 1869.

IMPROVED DEVICE FOR DISPLAYING DRY GOODS.

The Schedule referred to in these Letters Patent and making part of the same.

*To all whom it may concern:*

Be it known that I, JOHN D. CHAMBERS, of West Lebanon, in the county of Warren, and State of Indiana, have invented a new and useful Improvement in Apparatus for Displaying Goods; and I do hereby declare that the following is a full, clear, and exact description thereof, which will enable others skilled in the art to make and use the same, reference being had to the accompanying drawings, forming part of this specification.

This invention relates to improvements in apparatus for displaying goods in mercantile establishments, generally woven fabrics, and consists of yard-arms, on which the goods are to be spread, adjustably supported on a stationary vertical shaft, so arranged that they can be raised up, or let down, and turned to any point around the axis of said shaft desired, provided with a wire, or cord, above them for supporting covering for protecting the goods, all as will be hereinafter specified.

Figure 1:
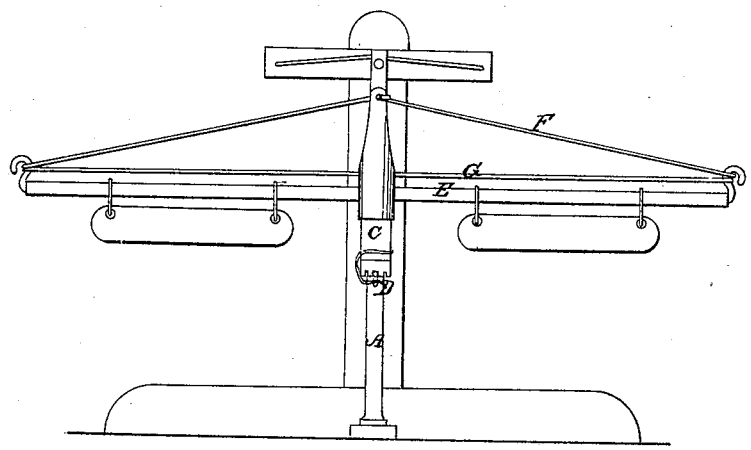
Figure 2:
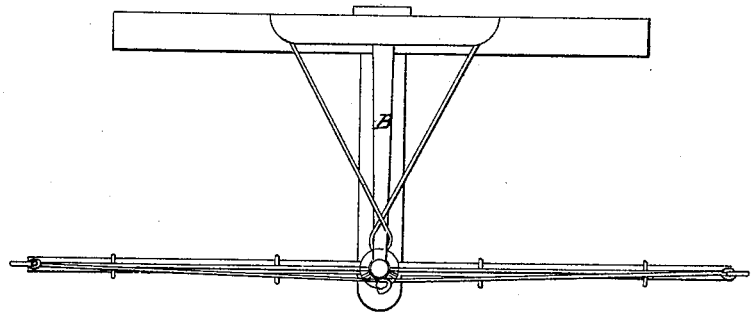

Figure 1 represents a front elevation of my invention; and,

Figure 2, a plan view of the same.

Similar letters of reference indicate corresponding parts.

A represents a stationary vertical shaft, through which are numerous small holes, designed to be supported on the counter, or table at the lower end, and at the upper end by a horizontal arm B, projecting from the wall of the building, or shelving, or other suitable support.

The said shaft is provided with a sleeve C, capable of sliding vertically, and oscillating on the shaft, to be supported at any desired height thereon, by a pin D, inserted in any of the numerous small holes before mentioned.

The lower end of the sleeve is provided with a notched ferrule, each notch being opposite another on a line through the centre, and placed on the sleeve, with the notched edge down. This ferrule is designed to prevent the sleeve from splitting, and to hold it at any point around the axis of the shaft, the sleeve resting on the pin D, in any of the notches desired.

E represents the yard-arms, supported radially by the sleeve, and by bracing-wire, or cord F, connected to the elevated portion C, of the sleeve, and to the hooks on their extreme ends.

The extreme ends of the said arms are provided with hooks, extending upward a short distance from the arms, to the top of which are attached the wire, or cord F, and the wire, or cord G, hereinafter mentioned. These hooks are designed to raise the wires, or cords, just high enough from the yard-arms so that they may not interfere in placing on, or removing, goods from the yard-arms.

G represents another wire, or cord, stretched from the sleeve to the hooks, running parallel, or nearly so, to and a short distance above said arms.

The goods to be exhibited may be spread upon the arms E, and in order to protect them from dust, flies, &c., a covering of muslin, or other suitable material, may be suspended from the wire or cord G, so as to cover them, the sides of which may be pinned, or otherwise fastened together immediately under said wire, or cord, and the front part thrown backward, or forward at pleasure, to display, or cover the goods.

The horizontal arm B may be supported, laterally, by any suitable system of bracing, but generally by a wire, or cord, connected with its projected end, and diagonally to the wall, or shelving.

Having thus described my invention,

I claim as new, and desire to secure by Letters Patent—

The combination of the perforated vertical shaft A, arm B, the sleeve C, provided with the notched ferrule, the pin D, the yard-arms E, having the hooks, the wires, or cords, G F, and the bracing-wire, all arranged as described, for the purpose specified.

JOHN D. CHAMBERS.

Witnesses:
ISAAC BOWLUS,
REVERDY I. BOWLUS.